United States Patent [19]
Barnes et al.

[11] 3,812,769
[45] May 28, 1974

[54] MANUFACTURE OF PLASTIC BAGS

[75] Inventors: John Grober Barnes, Brampton, Ontario; Emil Bizon, Mont-Saint-Hilaire, Quebec; Charles Robertson Murray, Toronto, Ontario; Edward Kenneth Rowley, Beloeil Station; Clayton Thomas Waugh, St. Leonard, Quebec, all of Canada

[73] Assignee: Canadian Industries Limited, Montreal, Quebec, Canada

[22] Filed: Dec. 7, 1972

[21] Appl. No.: 312,961

[30] Foreign Application Priority Data
Dec. 20, 1971  Canada................................. 130613

[52] U.S. Cl. .................... 93/35 R, 93/8 VB, 93/18, 93/33 H, 93/DIG. 1
[51] Int. Cl. ........................ B31b 1/84, B31b 41/60
[58] Field of Search .......... 93/35 R, 8 VB, 8 R, 1 F, 93/13, 18, 19, 20, 33 H, DIG. 1

[56] References Cited
UNITED STATES PATENTS

| | | | |
|---|---|---|---|
| 2,525,139 | 10/1950 | Ligon | 93/DIG. 1 |
| 3,334,553 | 8/1967 | Hewitt et al. | 93/35 R |
| 3,308,722 | 3/1967 | Peterson | 93/35 R |
| 3,371,849 | 3/1968 | Rochla | 93/8 VB |
| 3,391,615 | 7/1968 | Lepisto | 93/35 R X |
| 3,654,015 | 4/1972 | Purcell et al. | 93/35 R X |

*Primary Examiner*—Granville Y. Custer, Jr.
*Assistant Examiner*—James F. Coan
*Attorney, Agent, or Firm*—Alexander O. McIntosh

[57] ABSTRACT

An apparatus and method for the manufacture of bags from a length of plastic film by folding inward and sealing together the longitudinal margins of the film to form a tube, and then sealing the tube transversely. The apparatus can be employed to manufacture valve bags having the valve formed by an unsealed portion of the longitudinal margins of the length of film. The length of film may be constituted by multiple plies of film.

11 Claims, 11 Drawing Figures

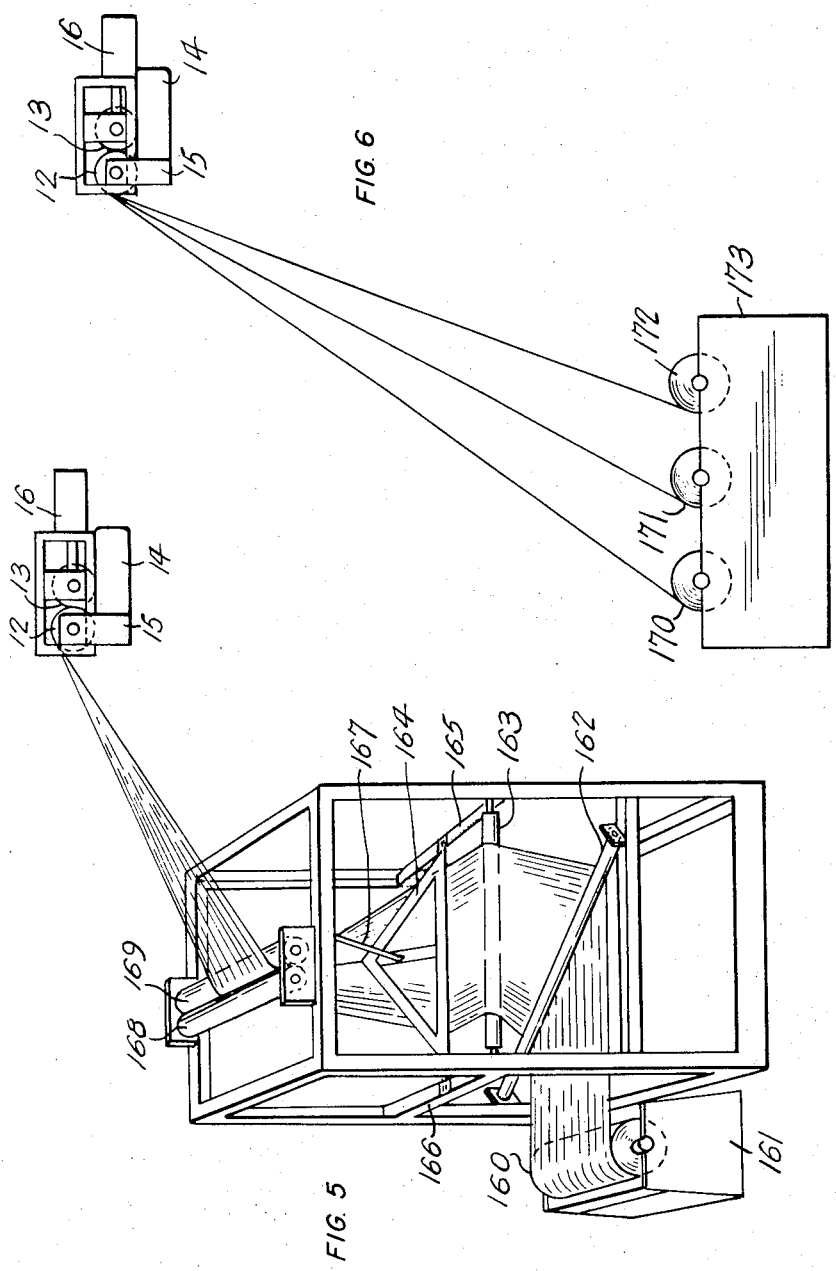

MANUFACTURE OF PLASTIC BAGS

This invention relates to a method for manufacturing plastic bags and more particularly to an apparatus for carrying out the method.

Bags fabricated from plastic materials such as polyethylene have found wide use in packaging applications. These bags may be either open ended, requiring separate provision for closing, or be fitted with a valved opening. Valve bags are in general use for packaging materials such as fertilizers and cement. These bags possess the important commercial advantage of easy filling and closing. A particularly useful valve bag is constructed from a rectangular sheet of film by infolding two opposite edges to a mutually overlapped position and sealing the overlapped edges along only a portion of their length, leaving the unsealed portion to act as a valve. The open ends of the thus formed tube are then sealed transversely to complete the bag. By employing analogous methods but sealing the overlapped edges of the sheet along their whole length and making only a single transverse seal, a simple open ended bag can be constructed. The bags may be constructed from one or more plies of film. When constructed of two-ply film it is convenient to employ a length of flattened tubing as the starting material.

The above mentioned bags can be constructed by hand but commercial utilization requires that bags be manufactured using high speed machine fabrication.

A method for rapid manufacture of said bags has now been devised in which the bag is fabricated automatically from a length of plastic film. The fabrication can be carried out employing modifications to known bag making machines.

It is thus the primary object of this invention to provide a method and apparatus for rapid fabrication of plastic bags. A further object is to provide a method and apparatus for the rapid fabrication of the valve bags. Additional objects will appear hereinafter.

The apparatus for manufacturing plastic bags in a continuous manner comprises 1. means for providing a single or multiple ply length of plastic film,
2. means for infolding both longitudinal margins of the length of film so that the margins lie in overlapped contact,
3. means for heat-sealing together the overlapped margins of the film along a line parallel to the longitudinal axis of the length of film to form a tube,
4. means for heat-sealing together the tube in a transverse seal at positions separated by the length of a completed bag, and
5. means for severing the sealed tube at a position adjacent to the transverse seal, thus severing consecutively produced bags.

When manufacturing valve bags the apparatus is modified to produce a longitudinal seal along a distance less than the length of a bag, the unsealed portions of the overlapped margins of the film forming the walls of the valve. Since both ends of the valve bag are sealed means are provided to sever the tube at the midpoint of the transverse seal, or alternatively two adjacent transverse seals are made and the film severed at a position between the transverse seals.

When the length of film is two-ply it may be two separate single-ply lengths placed in contact, or a single-ply sheet that has been folded longitudinally to form a two-ply length having a fold along one longitudinal margin, or a length of flattened tubing. The length of flattened tubing may be slit along one margin to form a two-ply length having a fold along one longitudinal margin. It is clear that three or more plies of film may be employed in manufacturing the bag.

The invention is illustrated by the accompanying drawings wherein

FIG. 5 is a view in perspective of a device for folding longitudinally a length of plastic film;

FIG. 6 is a diagrammatic side elevation of a device for providing a three-ply length of plastic film;

Figure 1:
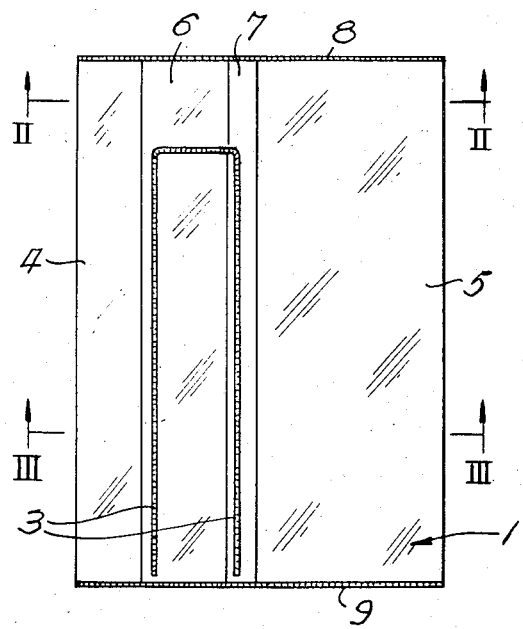
FIG. 1 is a plan view of a valve bag in flattened configuration.
Figure 2:
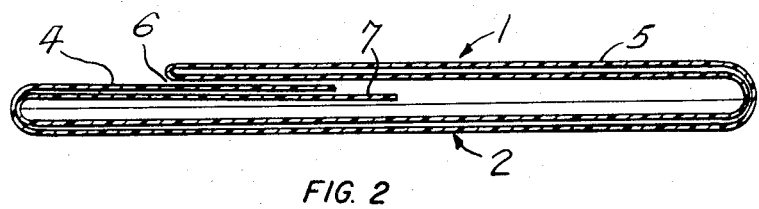
FIG. 2 is a section of the line II—II of FIG. 1.
Figure 3:
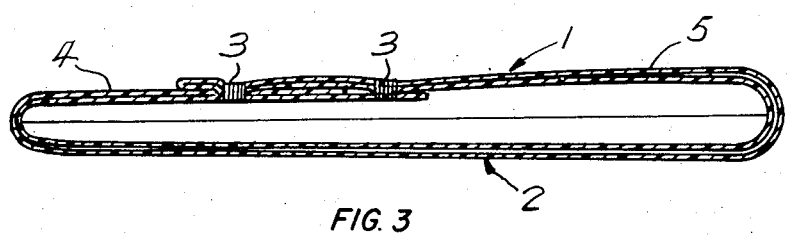
FIG. 3 is a section of the line III—III of FIG. 1.

Referring to FIGS. 1, 2 and 3 a preferred embodiment of a valve bag is shown. This comprises a two-ply front wall 1 and two-ply back wall 2. The front wall 1 includes a longitudinal seal 3 in hair pin form, which joins the two portions 4 and 5 that constitute the front panel. It can be seen from FIGS. 2 and 3 that front panel 1 is formed by the folding inward of the two margins of a length of flattened tubing. The flattened tubing forms the double ply walls of the bag. Seal 3 joins the two margins along only part of the length of the bag leaving a valve opening 6. The two plies of portion 4 of the front panel that form the inner wall of the valve are separated at a position adjacent to the margin that lies in the interior of the bag. This provides a thin flap 7 at the edge of the inner opening of the valve. Flap 7 assists in sealing the valve. The front and back panels are sealed transversely by seals 8 and 9. If desired, the two plies of the inner wall of the valve may be of the same length, eliminating flap 7. The bag construction is not limited to the use of two-ply film. Single-ply film may be used but a bag with a single-ply wall is not normally as strong as one with two or more ply walls. For certain applications it may be of advantage to employ three or more plies of film in constructing the bag. One of the plies may carry printed information. Alternatively, one of the plies may contain dispersed pigment such as carbon black. This valve bag is described in Canadian patent application Ser. No. 180,630 filed on Mar. 24, 1971 in the name of Charles R. Murray.

Figure 4:
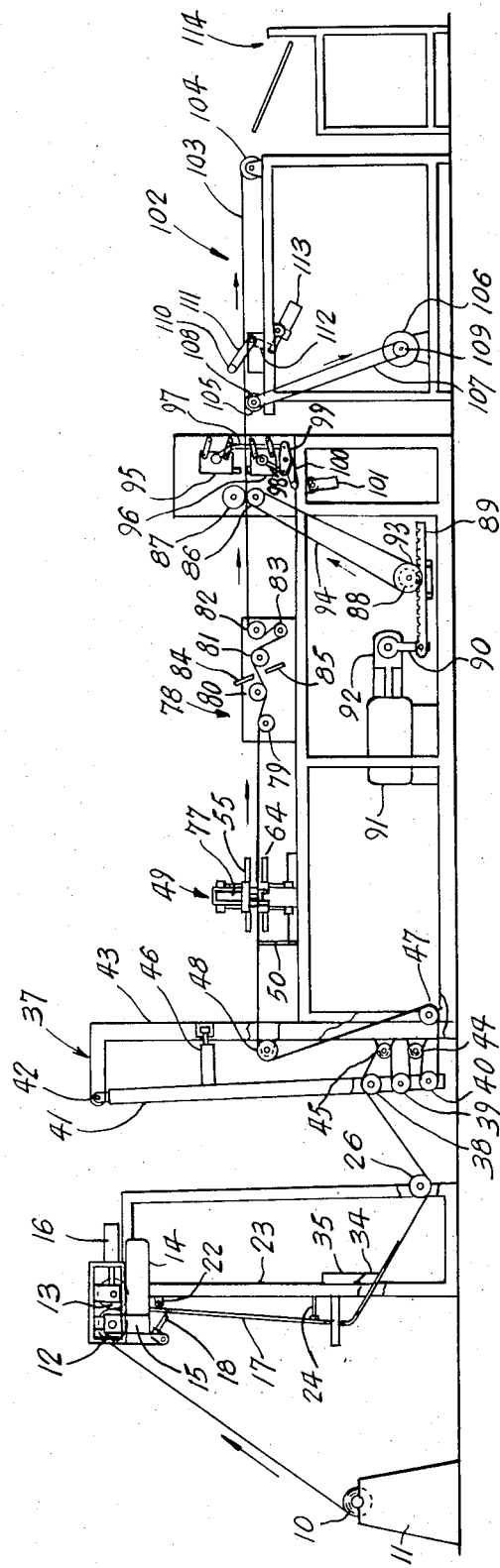
FIG. 4 is a diagrammatic side elevation of a machine for fabricating the bag of FIG. 1.

The manufacture of the above described valve bag is preferably carried out employing a machine shown in FIG. 4.

Figure 7:
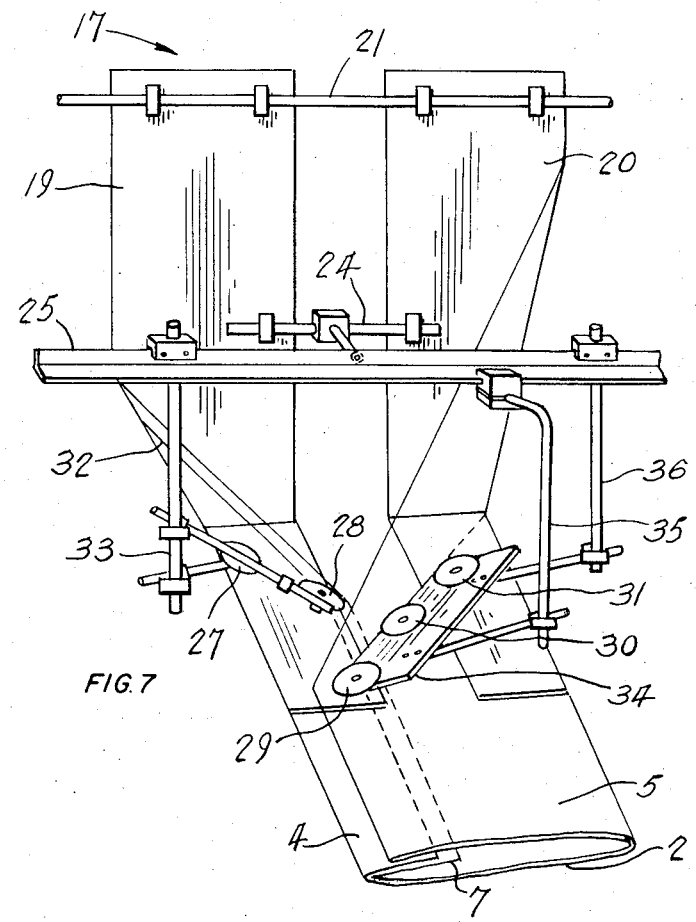
FIG. 7 is a view in perspective of the element of the machine of FIG. 4 which infolds the margins of the flattened plastic tubing.

A roll of flattened plastic tubing 10 is supported for rotation on stand 11. The tubing drawn from roll 10 passes between nip rolls 12 and 13 driven by motor 14 through reduction gearing 15. Roll 13 is mounted in bearings that are movable in a horizontal plane thus permitting the opening of the nip rolls. Two air cylinder-piston units 16 are adapted to move nip roll 13. After passing through nip rolls 12, 13 and length of flattened tubing passes over folding former 17. This is shown in detail in FIG. 7. As the flattened tubing leaves the nip rolls 12, 13 it contacts slitting knife 18 which slits the outer ply of the tubing adjacent to one margin. The slit tubing passes to the lower part of folding former 17 where both margins are folded inward to form a double walled tube. It is to be noted that the folding former 17 is constituted by two plates 19, 20 which are attached to the framework of the machine. Rod 21, pivotally mounted in two brackets 22 carried by machine uprights 23, holds the top of the folding former. The lower part of the folding former is supported by T-shaped member 24 fastened to cross piece 25 of the machine. The outer borders of the lower portions of plates 19 and 20 are tapered inward corresponding to the folding configuration desired. In FIG. 7 the taper of plate 20 commences at a higher level than the taper of plate 19 as required to provide inwardly folded tubing borders with the overlap of the borders occurring over the base of plate 19. The bases of both plates 19 and 20 are bent upward at an obtuse angle so as to direct the infolded tubing toward roll 26.

The infolding of the tubing margins is carried out by means of rotatable guide wheels 27, 28, 29, 30 and 31. Guide wheels 27 and 28 fold in the left margin of the tubing, guide wheel 28 serving also to unfold the edge fold of the margin slit open by knife 18. The position of this longitudinal slit is shown at 32. The unfolded edge portion forms thin flap 7 of the valve of a completed bag. Guide wheels 29, 30 and 31 fold in the right margin of the tubing so that it lies above the infolded left margin of the tubing. The infolded margins of the tubing form portion 4 and 5 of the front panel 1 of a completed bag, the central portion of the tubing forming the back panel 2 of the completed bag. Guide wheels 27 and 28 are attached to support rod 33 which in turn is attached to cross piece 25 of the machine. Guide wheels 29, 30 and 31 are carried by plate 34 which in turn is attached through support rods 35 and 36 to cross piece 25 of the machine.

The infolded tubing next passes over roll 26 to accumulator 37. The accumulator is provided with a set of three rolls 38, 39 and 40 mounted for rotation on movable frame 41. Frame 41 is attached by hinge 42 to the fixed portion 43 of the framework of the accumulator. Rolls 44 and 45 are mounted for rotation on the fixed portion of the framework. The infolded tubing passes successively over rolls 38, 45, 39, 44 and 40 of the accumulator. The moveable frame 41 is urged outward by means of air piston-cylinder unit 46. This movement of frame 41 serves to compensate for the stop-go motion of the tubing during successive cycles of the machine. It is preferred to fit the accumulator with a variable speed motor control so that motor 14 can be reduced in speed when the amount of tubing in the accumulator increases.

Figure 8:
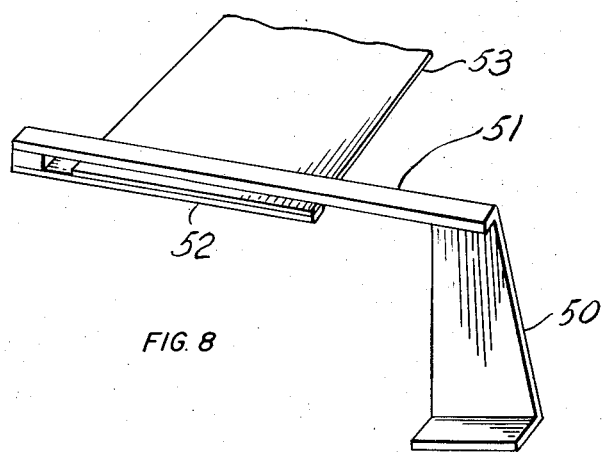
FIG. 8 is a view in perspective of the element of the machine of FIG. 4 which prevents sealing together of the front and back panels of the valve bag during formation of the longitudinal seal of the bag.

The tubing passes from the accumulator over rolls 47 and 48 and continues to the device for heat-sealing together the two infolded margins of the tubing. The heat-sealing device is shown generally at 49 in FIG. 4. Just prior to entering the heat-sealer 49 the infolded tubing passes around a seal-inhibitor which functions to prevent the sealing together of the front and back panels of the bag during the sealing together of the overlapping margins of the tubing. This device is shown in FIG. 8. Bracket 50, attached to the framework of the machine, carries a J-shaped member 51, to the short arm 52 of which is attached a flexible heat-resistant seal-inhibiting tongue 53. Tongue 53 may be formed from a length of silicone rubber covered with a glass cloth-polytetrafluoroethylene jacket. The infolded tubing is fitted around the seal-inhibitor so that the long arm of 51 passes between the overlapped margins of parts 4 and 5 of the front panel of the bag. The short arm 52 with attached tongue 53 fits between part 4 of the front panel and the back panel 2 of the bag. Tongue 53 thus lies down stream of the moving tubing at a position between the sealing elements of 49.

Figure 9:
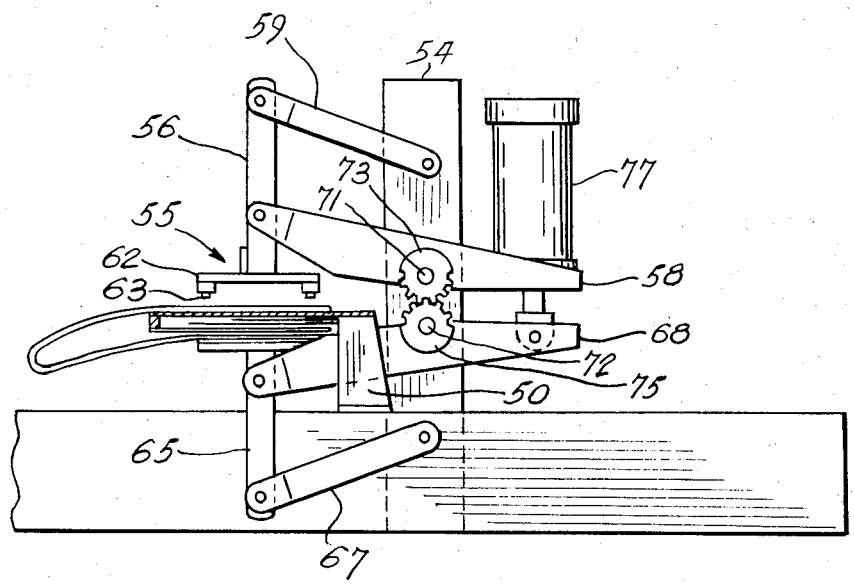
FIG. 9 is a side elevation of the element of the machine of FIG. 4 which forms the longitudinal seal of the bag.
Figure 10:
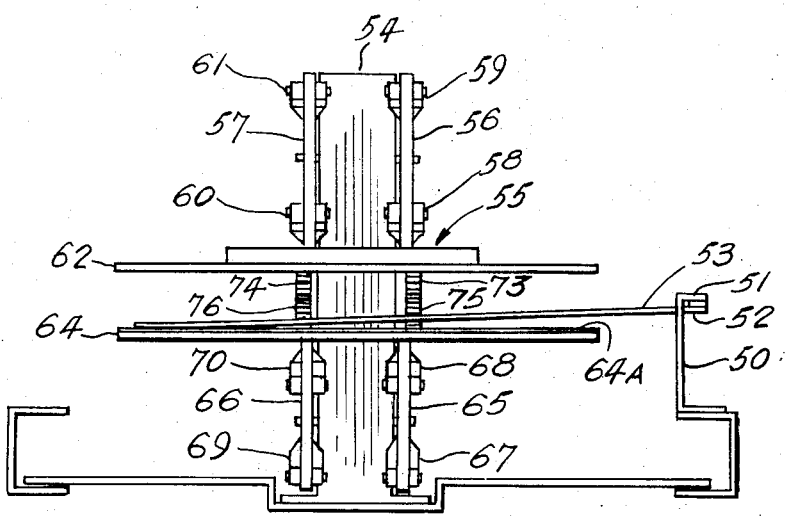
FIG. 10 is a front elevation of the machine element shown in FIG. 9.

Heat sealer 49 is shown in detail in FIGS. 9 and 10. The movable parts of the sealer are attached to column 54 which is fixed to the framework of the machine. The heat-sealing element 55 is carried in a linkage comprising two vertical columns 56, 57, attached to the sealing element, and four arms 58, 59, 60 and 61 linking columns 56, 57 to column 54. The sealing element comprises horizontal plate 62 carrying an electrically heated hair pin-shaped sealer bar 63. Sealer bar 63 corresponds in shape to seal 3 of the completed bag. Clearly the shape of the sealer bar will be chosen to provide the shape of the desired seal. When simple open-ended bags without valves are to be fabricated a sealer bar forming a single seal of length of the bag will be employed. When valve bags are being fabricated the hair pin-shaped sealer bar can be replaced by a multiple element bar forming a maze seal. An anvil against which sealing element 55 presses the tubing during sealing comprises horizontal plate 64 attached to two vertical columns 65 and 66. The upper surface of plate 64 is covered with a rubber pad 64A. Columns 65 and 66 are linked to column 54 by four arms 67, 68, 69 and 70.

Arms 58 and 60 are attached to the ends of shaft 71 passing through column 54. Arms 68 and 70 likewise are attached to the ends of shaft 72 passing through column 54. On the ends of shaft 71 are affixed two gears 73, 74 which mesh with two corresponding gears 75, 76 mounted on the ends of shaft 72. Power to operate the sealing device is provided by air piston-cylinder unit 77. The cylinder of this unit is fixed to the ends of arms 58 and 60 while the piston is fixed to the ends of arms 68 and 70. When the piston is extended sealer bar 63 is pressed against anvil plate 64. The meshing of gears 73 and 75 and of 74 and 76 equalizes the motions of the sealing element and anvil. It can be seen that the seal-inhibiting tongue 53 lies between anvil 64 and sealing element 55.

After leaving the longitudinal heat-sealing device the tubing next passes to a photoelectric scanner shown generally at 78. The function of the scanner is to detect the passage of fiducial marks printed on the surface of the tubing. These marks are printed on the film at intervals equivalent to one bag length. The photo-electric cell detects these marks and produces a signal that controls the intermittent motion of the tubing and serves to keep the information printed on the film in register with the longitudinal and transverse seals. The scanner comprises a series of rotatable rolls 79, 80, 81, 82 and 83 over which the tubing passes thus ensuring constant position of the tubing. Photoelectric cell 84 is directed against lamp 85. Passage of a fiducial mark produces a signal in the photoelectric cell circuit.

From the photoelectric scanner the tubing passes to a transverse sealer. This sealer forms the transverse seals 8 and 9 that are situated at the top and bottom of the bag. It also has associated means for severing the sealed tubing at the position of the seal. The tubing is drawn into the sealer by means of intermittently rotating rolls 86 and 87. The intermittent motion is generated by pinion gear 88 engaging rack bar 89. Reciprocating motion is transmitted to rack bar 89 by crank 90 that is rotated by the action of motor 91 through reduction gearing 92. Pinion 88 is connected through a unidirectional clutch to gear 93. Thus gear 93 turns during only half of each revolution of crank 90. Gear 93 drives roll 86 through chain 94. Roll 87 is connected to roll 86 by meshed gears attached to the shafts of these rolls. A brake is provided that is actuated when the clutch disengages, so that the rolls 86, 87 come to rest quickly when the clutch is disengaged.

When rolls 86 and 87 are at rest a transverse sealing unit is actuated. This comprises upper element 95 carrying a transverse sealer bar, and lower element 96 carrying a transverse anvil. Elements 95 and 96 are adapted to move in a vertical sense, being connected by linkages to the frame of the sealing unit. Operation of the sealing elements during sealing is carried out by means of rods 97 and 98 connecting the respective elements 95 and 96 to lever 99. Lever 99 is fixed at its mid-point to a shaft which also carries arm 100. Arm 100 is actuated by air piston-cylinder unit 101, thus pressing the sealer bar against the anvil when the piston is extended.

The tubing with transverse seal made passes from the sealing unit to belt conveyor 102. Conveyor 102 comprises a set of endless belts 103 travelling over rollers 104, 105. The belts are driven by electric motor 106 through chain 107 engaging sprockets 108 and 109 fixed to the shafts of roller 105 and of the motor respectively.

Located transversely above belts 103 is rotatable roller 110. This is carried by two arms 111 affixed to a cross shaft to which is affixed crank 112. Crank 112 is actuated by air piston-cylinder unit 113. Thus when the piston is retracted roller 110 is pressed against belts 103 placing tension on the tubing issuing from the transverse sealing unit. The operation of air piston-cylinder units 101 and 113 are timed so that tension is placed on the tubing immediately after the sealer bar has been retracted and the seal area is molten and flowable. The tension placed on the tubing by the combined action of belts 103 and roller 110 severs the tubing at the seal position. This type of combined sealing and severing is described in Canadian Pat. No. 864,509 issued on Feb. 23, 1971 in the names of Edward K. Rowley and Clayton T. Waugh. The severed bag is then delivered by belt conveyor 102 to receiving stand 114.

When the apparatus is employed to fabricate simple open-ended bags upper element 95 of the transverse sealing unit is operated at a temperature such that the seal area of the film does not become fluid. Thus a single transverse seal will be formed without severing the sealed film. In this case a separate transverse severing blade is provided to sever the sealed film adjacent to the transverse seal. This severing blade is actuated by an air piston-cylinder unit whose operation is synchronised with the operation of the transverse sealing unit.

The machine shown in FIG. 4 is adapted to fabricate valve bags from a length of flattened plastic tubing. However, the invention is not limited to the use of flattened tubing as starting material. A single-ply length of material may be employed thus forming a bag with single-ply walls. In this case roll 10 will be of single-ply film and slitting knife 18 will not be used. A two-ply walled bag may be formed from a longitudinally folded length of single-ply film. A device suitable for providing a folded two-ply length of film is illustrated in FIG. 5. At 160 is shown a roll of single-ply film supported for rotation on stand 161. The film from the roll 160 passes over diagonal bar 162 and roller 163 and then is folded longitudinally about A-frame 164. The A-frame is supported by attachment to cross pieces 165, 166 of the framework of the folding device and by rod 167 also attached to another cross piece of the framework. After passing over A-frame 164 the longitudinally folded length of film passes between rollers 168, 169 which complete the folding. The folded length of film then passes through nip rolls 12, 13. It is clear that in this case it will not be necessary to use slitting knife 18. By appropriate adjustment of the folding of the length of film one of the open edges can be made to protrude beyond the other so as to provide flap 7 shown in FIGS. 1 and 2.

The fabrication of multiple ply walled bags can be carried out by feeding two or more separate but superimposed single-ply length of film to nip rolls 12, 13. A device for providing multiple lengths of film is illustrated in FIG. 6. Three rolls of film 170, 171 and 172 are supported for rotation in stand 173. Film from the three rolls is superimposed when passed between nip rolls 12 and 13. It can be seen that all three plies of the film need not be of the same width. If roll 171 is of width corresponding to wall 2 (FIGS. 2, 3), the film of rolls 170 and 172 being of full width, a bag having three plies in wall 2 and two plies in wall 1 can be formed. If desired, the film of roll 171 may be of different colour from that of rolls 170, and 172.

Alternatively, one or more of rolls 170, 171, 172 may be of flattened tubing, providing additional plies for the walls of the valve bag.

Figure 11:
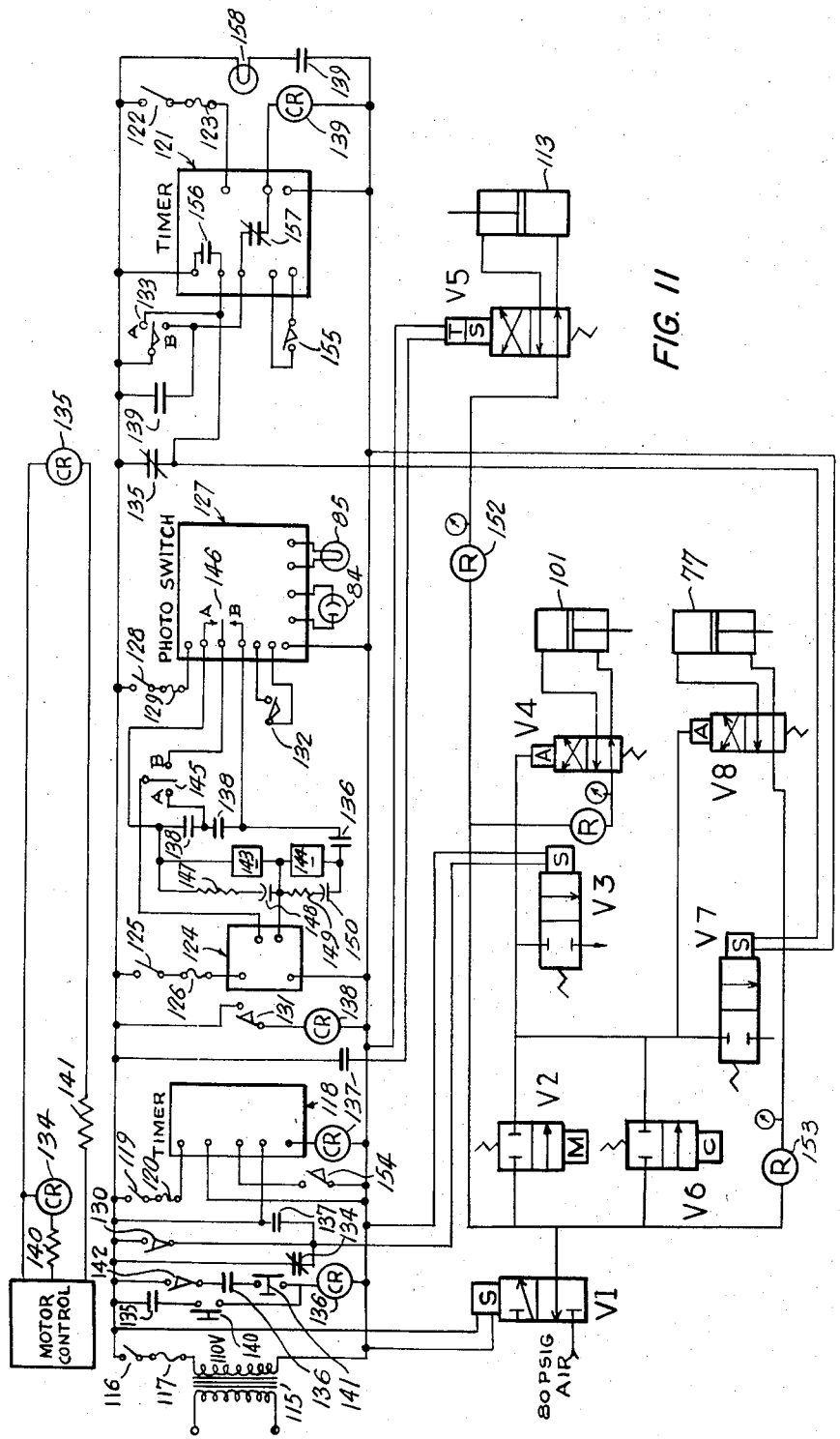
FIG. 11 is a diagrammatic representation of the electrical and pneumatic control system of the machine of FIG. 4.

The operation of the several elements of the bag making machine of FIG. 4 is coordinated and controlled by a pneumatic-electrical circuit illustrated in FIG. 11. The eight pneumatic valves of the circuit have the following characteristics.

V1 — a three was solenoid actuated spring return valve.

V2 — a two way manually actuated spring return valve.

V3 — a two way solenoid actuated spring return valve.

V4 — a four way air actuated spring return valve.

V5 — a four way valve, solenoid actuated through a time delay unit, with spring return.

V6 — a two way cam operated spring return valve.

V7 — a two way solenoid actuated spring return valve.

V8 — a four way air actuated spring return valve.

The electrical control circuit is powered through transformer 115, the output of which is controlled by switch 116 and associated fuse 117. The output is applied to transverse sealer unit timer 118 through switch 119 and associated fuse 120; to longitudinal sealer unit timer 121 through switch 122 and associated fuse 123; to direct current power supply 124 through switch 125 and associated fuse 126; and to photoelectric switch unit 127 through switch 128 and associated fuse 129.

The operation of the two sealing units is coordinated with respect to the shaft of crank 90. During the first half revolution of the crank (0°–180°) the tubing is in motion and no sealing can take place. All sealing operations must take place during the second half revolution (180°–360°) when the tubing is at rest. The shaft of crank 90 is fitted with five cams which operate air valve V6, and electrical switches 130, 131, 132 and 133 respectively. Switch 130 is closed during 0°–180° of rotation of the crank. Switch 131 is closed during 180°–350° of rotation of the crank. Switch 132 is closed during 150°–330° of rotation of the crank. Switch 133 has two positions A and B. A is closed during 0°–180° of rotation of the crank and opened during 180°–360° of rotation. B is closed during 180°–360° of rotation of the crank and opened during 0°–180° of rotation. Switches 130 and 133 are adapted to actuate valves V3 and V7 respectively during 0°–180° of rotation of the crank (when the tubing is in motion) thus causing the sealer bars of both units to be raised. The electrical control circuit includes six control relays which in FIG. 11 are shown with the relay coil designated CR separate from the relay contactors which are shown as elements of the circuit controlled. These relays are indicated by reference numerals 134, 135, 136, 138 and 139.

Control relays 134 and 135 are energized by the motor control of motor 91 through conductors including resistors 140, 141 respectively. Their contactors are adapted to open when the relay coil is energized. Thus if motor 91 should stop contactors 134 and 135 would close actuating valves V3 and V7 respectively, causing the sealer bars of both sealing units to be raised.

With motor 91 running the closing of switch 116 will energize valve V1, supplying compressed air to the pneumatic circuit. A suitable air pressure is 80 pounds per square inch. Switch 142 is located on accumulator 37 and is adapted to open when the accumulator is in its extended positon indicating exhaustion of the supply of tubing. Switch 142 normally is closed. During operation switches 119, 125, 128 and 122 will have been closed manually.

When switch 140 is closed manually, switch 141 being normally in closed position, control relay 136 will be energized only if the contactors of control relay 138 are closed. Control relay 138 is energized through the action of switch 131 which is closed only when crank 90 is in the 180°–350° portion of revolution. Thus control relay 138 is energized intermittently in synchronization with the motion of crank 90. When energized it actuates three sets of contactors. One in the circuit of switch 140 permits the energizing of control relay 136. The other two sets are a pair in the energizing circuits of brake 143 and clutch 144. The contactors in the brake circuit are normally closed whereas the contactors in the clutch circuit are normally open. When brake 143 is energized it acts to prevent rotation of the shaft of gear 93 which drives transverse sealer rolls 86, 87. When clutch 144 is energized it connects pinion 88 to gear 93 thus imparting motion to transverse sealer rolls 86, 87. The energizing circuit of clutch 144 includes a contactor that closes when control relay 136 is energized. Thus control relay 136 must be energized before clutch 144 can operate. The direct current power from power supply 124 is connected to the brake and clutch energizing circuits through two position switch 145. When switch 145 is in the A position switch 131 controls the brake and clutch. When switch 145 is in the B position the two position switch 146, responsive to photoelectric cell 84, controls the brake and clutch, the brake and clutch contactors of control relay 138 being bypassed. Photoelectric cell 84 detects the passage of fiducial marks on the tubing passing through scanner 78 and changes the switch 146 from the B position to the A position, thus disconnecting clutch 144 and applying brake 143. The circuits of the brake and clutch also include resistors 147, 149 and capacitors 148, 150.

When control relay 136 is energized it closes its contactors in the circuit of switch 141 with the result that control relay 136 will continue to be energized during the non-energized positions of control relay 138. However, if switch 141 is opened control relay 136 will cease to be energized.

Concurrently, crank 90 actuates cam operated valve V6 at the beginning of the 180°–360° portion of its rotation. It is during this period that the tubing is at rest. Valve V6 supplies compressed air to valves V4 and V8 changing the position of these valves to direct compressed air to cylinders 77 and 101 of longitudinal and transverse sealers respectively extending the pistons and forcing the sealer bars against the tubing. As the transverse sealer bar is lowered against the tubing it closes switch 154 actuating timer 118. After a predetermined time interval during which the tubing is being sealed the timer energizes control relay 137. Control relay 137 closes its two associated contactors actuating solenoid controlled valves V3 and V5. Valve V3 exhausts control air from valve V4 causing the piston of piston-cylinder unit 101 to retract, thus raising the transverse sealer bar. Valve V5 contains a delay device so that it is actuated later than valve V4. Valve V5 directs air to air piston-cylinder unit 113 retracting the piston and forcing roller 110 against moving belt 103 of belt conveyor 102. This action, owing to the delay, takes place when the transverse sealer unit is open and so severs the tubing at the position of the molten transverse seal.

When air piston-cylinder unit 77 forces the longitudinal sealer bar against the tubing it closes switch 155 actuating timer 121. During the sealing operation switch 133 has been in the B position energizing control relay 139. This results in indicator lamp 158 being locked in an "on" state regardless of the action of switch 133. When the predetermined time interval has passed contactor 156 is closed actuating solenoid controlled valve V7. Valve V7 exhausts control air from valve V8 retracting the piston of piston-cylinder unit 77 and raising the longitudinal sealer bar. At the same time contactor 157 is opened, deenergizing control relay 139 and extinguishing indicator lamp 158. Indicator lamp 158 provides a visual indication of the duration of the sealing step. Manually actuated valve V2 permits the two seals to be made manually. The air to valves V4, V5 and V8 is reduced in pressure by pressure reducing valves 151, 152 and 153 respectively.

If the time intervals set in timers 118 and 121 are longer than the 180°–360° portion of rotation of crank 90, cam operated switches 130 and 133 will close to override the timers and raise both sealing units.

The cycle of sealing and severing operations continues as long as the tubing continues to be supplied by the accumulator.

The machine provides a rapid method for manufacturing plastic bags and is especially useful for the continuous manufacture of valve bags.

What we claim is:

1. An apparatus for the manufacture of plastic valve bags in a continuous manner comprising
   1. means for providing a single or multiple ply length of plastic film,
   2. means for infolding both longitudinal margins of the length of film so that the margins lie in overlapped contact, the overlapped portions being adequate to form the walls of a valve,
   3. means for heat-sealing together the overlapped margins of the film by a longitudinal seal running along a line parallel to the longitudinal axis of the length of film for a distance less than the length of a bag to form a tube,
   4. means for heat-sealing together the overlapped margins of the film by a transverse seal located at one end of the longitudinal seal,
   5. means for heat-sealing together the tube, including the overlapped margins of the film, in a transverse seal at a position adjacent to the second end of the longitudinal seal, the unsealed portions of the margins of the film forming the walls of a valve, and
   6. means for severing the sealed tube transversely at the position of the transverse seal, thus severing consecutively produced bags.

2. An apparatus as claimed in claim 1 adapted to heat-seal together the tube transversely at positions corresponding to both borders of the transverse severing position in the form of a double seal, thus forming end closures for two consecutively produced bags.

3. An apparatus as claimed in claim 1 wherein the length of film is a length of flattened tubing having its margins constituted by the tubing folds and there is provided (a) means for slitting longitudinally one margin of said tubing at a position corresponding to the inner wall of the valve, and (b) means for unfolding the tubing fold adjacent to the slit margin.

4. An apparatus as claimed in claim 1 wherein there is provided means for folding longitudinally a length of single-ply film to form a two-ply length of film having one border constituted by a fold, the other border being open.

5. An apparatus as claimed in claim 1 wherein the means for providing a multiple ply length of plastic film comprises a plurality of rolls of film adapted to feed a plurality of superimposed plies of film to the infolding means of the apparatus.

6. An apparatus as claimed in claim 1 wherein the means for infolding both margins of the plastic film comprises a former plate having the lateral margins of one extremity tapered inward, and rotatable guide means located adjacent to the tapered extremity of the former plate and adapted to fold the two margins of the film inwardly over the tapered extremity of the former plate.

7. An apparatus as claimed in claim 1 wherein the means for sealing together the overlapped margins of the length of film comprises a hair pin-shaped heat-sealing element positioned to make a seal having its curved portion adjacent to the valve of the finished bag.

8. An apparatus as claimed in claim 1 wherein the means for sealing together the overlapped margins of the film includes a tongue of flexible heat-resistant, seal-inhibiting material adapted to lie between the margins to be sealed and the back wall of the bag.

9. An apparatus as claimed in claim 1 wherein the operation of the several elements is controlled and coordinated by a pneumatic-electrical control system.

10. An apparatus as claimed in claim 1 wherein the means for heat-sealing the tube transversely is adapted to concurrently seal and sever the sealed tube at the midpoint of the transverse seal.

11. A method for the manufacture of valve bags in a continuous manner comprising the steps of
    1. providing a single or multiple ply length of plastic film,
    2. infolding both longitudinal margins of the length of film so that the margins lie in overlapped contact, the overlapped portions being adequate to form the walls of a valve,
    3. heat-sealing together the overlapped margins of the film by a longitudinal seal running along a line parallel to the longitudinal axis of the length of film for a distance less than the length of a bag to form a tube,
    4. heat-sealing together the overlapped margins of the film by a transverse seal located at one end of the longitudinal seal,
    5. heat-sealing together the tube, including the overlapped margins of the film, in a transverse seal at a position adjacent to the second end of the longitudinal seal, the unsealed portions of the margins of the film forming the walls of a valve, and
    6. severing the sealed tube transversely at a mid-point of the transverse seal, thus severing consecutively produced bags.

* * * * *